(No Model.)
G. A. CASSAGNES.
SYSTEM OF SYNCHRONISM FOR TELEGRAPHY.
No. 375,339. Patented Dec. 27, 1887.
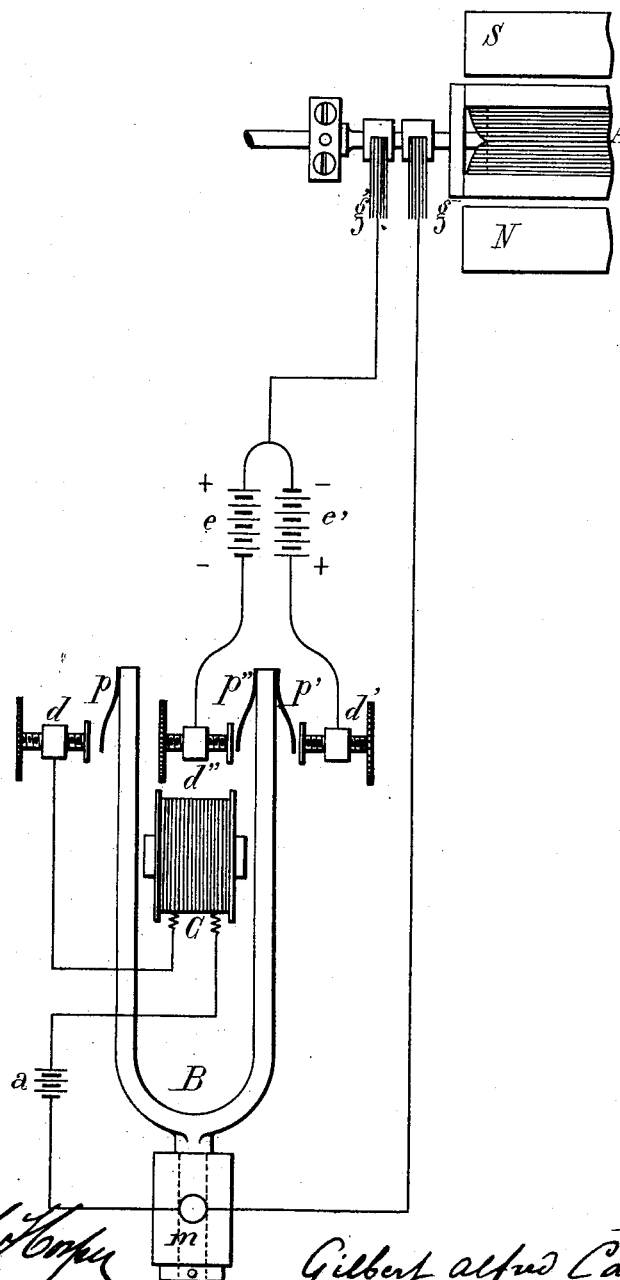

UNITED STATES PATENT OFFICE.

GILBERT ALFRED CASSAGNES, OF PARIS, FRANCE.

SYSTEM OF SYNCHRONISM FOR TELEGRAPHY.

SPECIFICATION forming part of Letters Patent No. 375,339, dated December 27, 1887.

Application filed August 30, 1887. Serial No. 248,250. (No model.)

*To all whom it may concern:*

Be it known that I, GILBERT ALFRED CASSAGNES, civil engineer, of Paris, in the Republic of France, have invented a System of Synchronism for Telegraphy; and I do hereby declare that the following is a full and exact description thereof, reference being made to the accompanying drawing.

In the patent recently issued to me, on August 30, 1887, No. 368,931, under the title of "System of Synchronism for Telegraphy," I have omitted to mention that I am also able, by means of external and internal contacts placed on the same prong of my three electro tuning-forks at both stations, to make use of alternative-current motors, if required, the method of synchronism remaining the same as in aforesaid patent.

The accompanying figure represents the arrangement of one of these electro tuning-forks, and I shall now proceed to describe its working, so as to complete my patent in this respect.

The tuning-fork B. is provided at the extremity of one of its prongs with the make-and-break arrangement $d$ and $p$, so as to keep it in a state of automatic and continual vibration by means of a local battery, $a$, and electro-magnet C, as already described in my aforesaid patent. The other extremity of the tuning-fork is provided with two platinum springs, $p'$ and $p''$—one external and the other internal—which are each in turn brought into contact with one or the other of two metallic contact-screws, $d'$ and $d''$, as the fork vibrates. These two contact-screws $d'$ and $d''$ are respectively connected with the positive and with the negative pole of a split battery, $e\ e'$, the middle of which is connected with the brush $g'$ of an alternative-current motor, A. The other brush, $g$, of this motor is electrically connected with the mass $m$ of the tuning-fork.

It will be seen from the examination of the figure that the vibrations of the tuning-fork will send alternately in the armature A of the electromotor currents of alternate polarity. These currents will arrive at equal intervals, and will be preferably of equal strength if battery $e$ is made equal to battery $e'$. By these means I am enabled to make use of an alternative-current electromotor, and by the well-known law of these apparatus the said motor will rotate synchronously with the vibrations of the tuning-fork B.

The electromotors can be of any suitable description.

The other tuning-forks mentioned in my aforesaid patent are similarly connected, if it is required to produce synchronism by means of alternative-current motors.

Having now described my invention, what I claim is—

The combination of an electro tuning-fork, B, a spring-contact, $p$, on one prong, a contact-screw, $d$, battery $a$, and electro-magnet C, for vibrating the tuning-fork, external contact-strip, $p'$, on the other prong of said tuning-fork, contact-screw $d'$, battery $e'$, and conductor connecting the battery with the screw $d'$, internal spring-contact, $p''$, on said latter prong, internal contact-screw, $d''$, battery $e$, and a conductor connecting said battery with the screw $d''$, all arranged and operating substantially as herein shown and described.

GILBERT ALFRED CASSAGNES.

Witnesses:
ROBT. M. HOOPER,
ALPHONSE BLÉTRY.